United States Patent Office 3,072,793
Patented Jan. 8, 1963

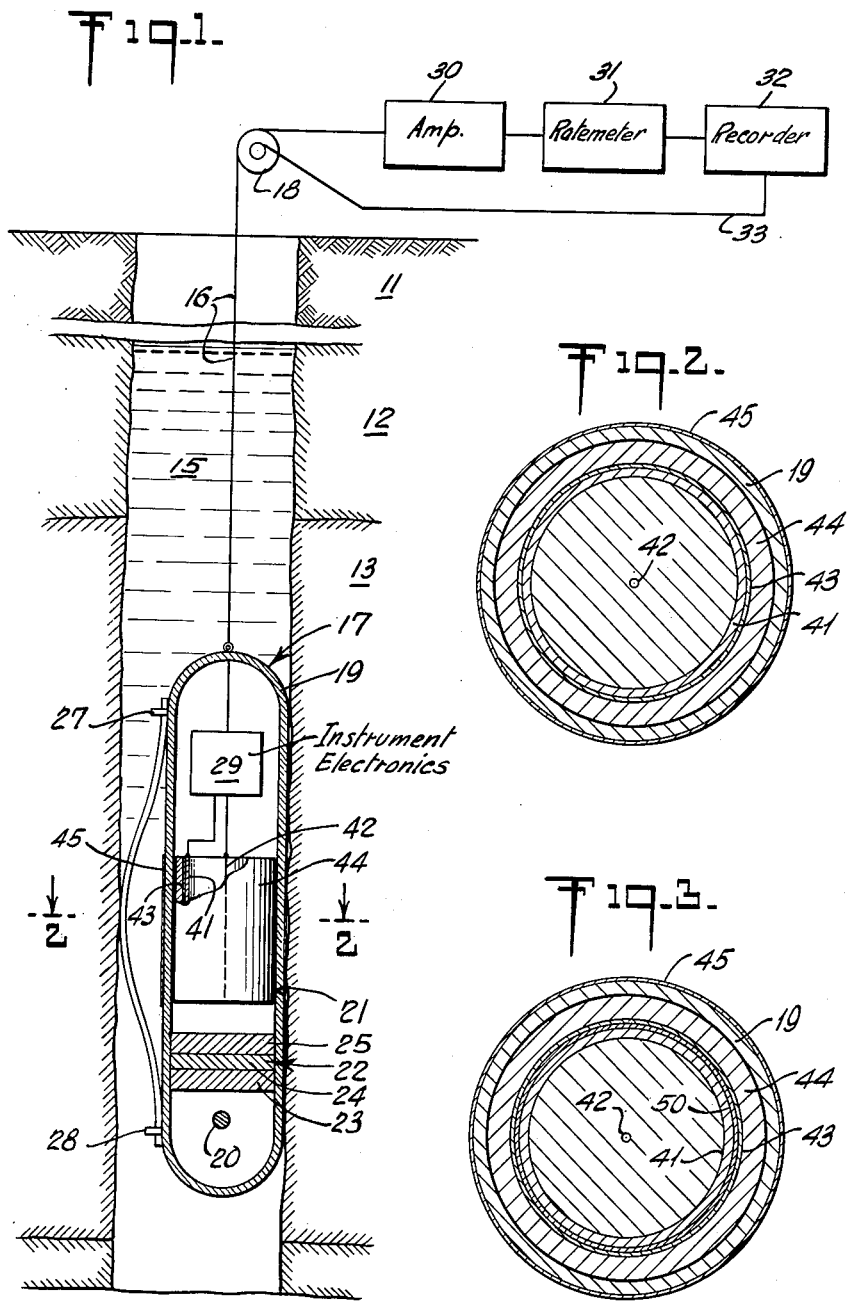

3,072,793
RADIOACTIVITY WELL LOGGING
Hugh E. Hall, Jr., Houston, Tex., assignor to Texaco Inc., New York, N.Y., a corporation of Delaware
Filed Dec. 7, 1959, Ser. No. 857,882
8 Claims. (Cl. 250—83.6)

The present invention relates generally to improvements in methods and apparatus for determining the nature of earth formations along the traverse of a bore hole and, more particularly, it is concerned with improvement for conducting neutron logs and is particularly directed toward improvements for the detection of neutrons.

Accordingly, it is a general object of the present invention to provide improvements in radioactivity well logging wherein a source of neutrons is employed to produce an observable effect indicative of the nature of the formations and wherein this effect is determined by detecting neutrons resulting in the formation.

It is well known to analyze earth formations in situ along the traverse of a bore hole through the use of various radioactivity analysis techniques including those known as neutron-neutron logs wherein a source of neutrons is passed through the bore hole to irradiate the earth formations and neutrons are detected in the bore hole as an indication of a characteristic of the formation. Since logs may be employed to determine the hydrogen content of the earth formations along the bore hole since the neutron flux at a certain distance from the neutron source is proportional to the ability of the earth formations to slow down the fast neutrons from the source. Hydrogen, the lightest of elements, is the most effective element in slowing down the fast neutrons from the source, therefore a neutron log may provide a good indication of the quantity of hydrogen present in the formation.

When fast neutrons from the source are slowed to the thermal energy range they are often captured by material present in the formation with the resultant emission of gamma radiation. In many cases, such as when a radium-beryllium source is used to provide the fast neutrons, there is also emitted by the source a significant flux of gamma radiation. Moreover, there is ordinarily present in the formation a natural gamma radiation component or background radiation. It will be apparent therefore that the neutron detector will be affected by the presence of these various gamma radiation components unless it is insensitive to the gamma radiation. Accordingly, it is a further object of the present invention to provide improvements in radioactivity well logging apparatus including a neutron detector which is substantially insensitive to the presence of gamma radiation.

Briefly stated, in accordance with one aspect of the present invention, there are provided methods and apparatus for logging earth formations along the traverse of a bore hole including the irradiation of the formations with fast neutrons and the detection of neutrons resulting in the formation in response to irradiation by the fast neutrons, which detection is accomplished through the instrumentality of a beta ray sensitive counter surrounded by a thin foil of indium to provide material for interaction with neutrons of predetermined energy with resultant emission of beta rays that are, in turn, detected by the beta ray counter. The counter is provided with a relatively thin outer wall, whereby beta radiation may enter the counter for detection and the wall provides an opportunity for relatively few interactions with gamma radiation.

For additional objects and advantages and for a better understanding of the invention, attention is now directed to the following detailed description and accompanying drawing. The features of the invention which are believed to be novel are particularly pointed out in the appended claims.

In the drawings:
FIG. 1 illustrates a side elevational view, partly in cross section, showing a well logging instrument positioned in a bore hole passing through a series of earth formations.
FIG. 2 is a cross-sectional view through the lines 2—2 of FIG. 1; and
FIG. 3 is a view similar to FIG. 2, showing a further embodiment of the invention.

Referring particularly to FIG. 1 of the drawing, there is shown a bore hole 10 traversing a plurality of earth formations 11, 12, 13 and 14 and containing a fluid content 15 which may comprise the usual drilling fluid, water or crude oil, for example. Suspended within the bore hole 10 as by means of a cable 16, there is shown a well logging instrument 17 constructed in accordance with the principles of the invention. The cable 16 may include an outer conductive sheath surrounding one or a plurality of insulated electrical conductors (not individually shown) in order to afford means for conducting electrical signals between the instrument 17 and electrical apparatus at the surface of the earth and for transmitting electrical power from the surface of the earth to the instrument in the bore hole. The details of the surface apparatus are discussed in greater detail below. A measuring apparatus, represented diagrammatically as a wheel 18, is shown at the surface of the earth in contact with the cable 16 and provides means for determining the length of the cable 16 suspended in the bore hole 10 during the course of a logging operation.

The logging instrument 17 comprises an outer housing or casing 19 ordinarily formed of steel in accordance with well-known techniques to withstand the temperatures and pressures commonly encountered in the well logging art. Within the casing 19 there is provided a neutron source 20 capable of producing fast neutrons for irradiating the earth formations along the traverse of the bore hole. The source may comprise a well-known mixture of radium and beryllium which emits a fast neutron flux as well as an incidental gamma radiation flux, or, preferably, the source comprises a so-called gamma-free neutron source such as plutonium-beryllium, polonium-beryllium, or radium D-beryllium or other well-known neutron sources of this type. It is also contemplated that the neutron source may be of the type wherein electrically charged particles are accelerated against a suitable target, for example, wherein deuterons are accelerated against a tritium target. Such sources may be pulsed or otherwise switched on or off as desired. These gamma-free sources are particularly advantageous in that they emit a substantial neutron flux without the presence of substantial gamma ray flux as in the case of a radium-beryllium source. Within the housing 19, spaced from the source 20 along the vertical axis of the instrument 17 there is provided an epithermal neutron detector 23 constructed in accordance with principles of the invention to detect epithermal neutrons while being substantially insensitive to gamma radiation. Intermediate the two devices 20, 21 there is provided a shield 22 for preventing undesired radiation produced by the source from reaching the detector 21. The shield 22 may advantageously comprise a layer of moderating material 23 such as paraffin, polyethylene or other hydrogenous material for moderating fast neutrons emitted by the source, followed by a layer of neutron capturing material 24 such as boron for absorbing the moderated neutrons and a third layer of lead or tungsten or other high density material 25 such as tungsten or lead for absorbing gamma rays produced by the source or resulting in the shield or other materials of the instrument 17 due to the neutrons from the source 20.

In order to minimize the influence of variations in the size of the bore hole on the resultant log it is contemplated that the logging instrument 17 may be provided with means for stabilizing the position of the instrument in the bore hole throughout the well log. Advantageously, this may comprise means for decentralizing the instrument such as the resilient bow spring 26 shown attached to the upper and lower ends of the instrument housing 19 as by means of upper and lower bolts or studs 27, 28 which pass through slots (not shown) in the respective ends of the bow spring 26 in order that the bow spring 26 may flex as the instrument 17 passes through portions of the bore hole 10 of varying sizes.

Within the housing 19, shown above the detector 21, there is provided electrical circuit apparatus associated with the operation of the detector 21, identified as the instrument electronics 29, for transmitting a signal from the detector 21 to electrical apparatus at the surface of the earth. The instrument electronics 29 may include an appropriate power supply for the detector 21 as well as pulse shaping, pulse scaling and amplifying apparatus for transmitting signal information over the cable 16 to the surface of the earth according to well-known electronic techniques. At the surface of the earth there is shown coupled to the cable 16 an amplifier 30 for receiving the signals from the logging instrument 17. The output of the amplifier 30 is shown coupled to a ratemeter 31 for providing a signal proportional to the rate-of-occurrence of the radiation detected by the detector 21. The ratemeter 31 may also include pulse shaping circuitry as desired for handling the signal information received over the cable 16 from the detector 21 in the logging instrument 17. The output of the ratemeter 31 is shown coupled to a recorder 32 for making a record or chart of the intensity, i.e. rate-of-occurrence of the radiation detected in the bore hole 10.

It is to be further understood that apparatus for carrying out the teachings of the present invention may involve the use of a logging instrument wherein the ratemeter and associated pulse shaping apparatus may be located in the downhole logging instrument rather than being part of the surface equipment. It is further contemplated that a signal indicative of the rate-of-occurrence of detected radiation may be transmitted to the surface by any known means of transmission such as in the form of frequency modulation information on a suitable carrier wave rather than in the form of a pulse type signal. It is also contemplated that other information may be transmitted from the logging information to the surface along with the neutron signal according to the invention. For example, other logging information such as the natural gamma radiations measured in the bore hole, caliper information, casing collar location information may also be transmitted to the surface along with the neutron logging signal.

It is to be understood that the record made on the recorder 32 may conveniently and advantageously consist of a record of the intensity of the detected radiation plotted in correlation with an indication showing the position of the detector 21 in the bore hole 10 throughout the well log. Accordingly, means shown diagrammatically as a conductive circuit path 33 are provided for coupling a signal from the depth measuring apparatus 18 to the recorder 32.

The details of the detector 21 may be better observed by referring now to FIG. 2 along with FIG. 1. The detector 21 comprises a thin walled beta ray counter 40 comprising an outer cylindrical cathode envelope or wall 41 of very thin metal or of glass having an internal conductive coating of very thin metal. The counter 40 is provided with a thin wire anode 42 running through the central axis of the cathode 41. The counter 40 is provided with the usual ionizable gaseous filling. The instrument electronics 29 includes means for applying an appropriate high voltage between the anode 42 and cathode 41 in order to establish the operation of the counter 40 in the Geiger region in a manner well known in the art. Insofar as the detection of gamma rays is concerned, the outer wall 41 of the beta counter 40 should be as thin as possible consistent with the desired degree of structural rigidity required for the logging operation. A suitable thickness for the outer wall of the beta counter is in the range of 20–50 milligrams per square centimeter. However, as set forth in greater detail hereinafter, a preferred novel aspect of the present invention involves the use of a counter wall which, either per se or together with an additional shielding member, is of appropriate thickness to exclude lower energy beta rays of the order of 1.0 m.e.v. from the detector. Surrounding the wall 41 of the counter 40 there is provided a cylindrical layer 43 of indium foil which, as will be described in greater detail hereinafter, is designed for resonance interaction with the neutrons to be detected with resultant emission of beta rays which are, in turn, detected by the beta ray counter.

Within the housing 19 and surrounding the detector including the indium foil 43 there is next provided a cylindrical layer 44 of high density material such as lead or tungsten for shielding the detector 21 from gamma radiation which might otherwise reach it.

Surrounding the housing 19 in the vicinity of the detector 21 there is advantageously provided a layer 45 of cadmium for intercepting thermal neutrons which might otherwise reach the detector 21. The cadmium layer 45 also prevents the thermal neutrons from reaching the housing 19 of the logging instrument 17 where they might readily be captured with resultant emission of relatively high energy capture rays, some of which might also reach the detector 21 to interfere with the desired neutron signal. Other materials for use as the high thermal neutron cross-section material or layer 45 surrounding the outside of the housing 19 include samarium and gadolinium.

The indium foil detects resonance neutrons which are those generally referred to as having energies between 1 electron volt and 100 electron volts, thus slightly overlapping the epithermal neutron range of .4 electron volt to 10 electron volts. It is noted that many references define the so-called resonance integral so as to include all energies above .4 electron volt.

The indium isotope 115 has a resonance integral of 2,580 barns. When a neutron is captured by the indium isotope 115 it results in results in the production of indium isotope 116 which decays by two channels, one of which has a 54 minute half life and the other having a 13 second half life. The 54 minute half life isomer decays by beta decay through three channels. The end point of the highest energy group is 1.00 million electron volts (hereinafter referred to as m.e.v., and the decay is by this channel 51 percent of the time. The 13 second half life isomer decays by beta emission which has an energy spectrum having an end point of 3.29 m.e.v. In the discussion to follow the former group will be called the 1.0 m.e.v. beta ray, and the latter group the 3.3 m.e.v. beta ray. According to the present invention the 3.3 m.e.v. beta ray is selectively detected to the exclusion of the 1.0 m.e.v. beta ray in order to provide a detection system having a suitable time constant for logging purposes.

According, the detector 21 should include means for selectively preventing 1.0 m.e.v. beta rays emitted by the indium foil 43 from passing into the counter 40 while permitting the 3.3 m.e.v. beta rays from the foil 43 to pass onto the counter 40 where they are detected. This may be accomplished by the provision of a beta counter wall 41 capable of absorbing beta rays of 1.0 m.e.v. and permeable to higher energy beta rays, particularly those of 3.3 m.e.v. A wall thickness of 0.5 mm. of aluminum would eliminate 88 percent of the 1.0 m.e.v. beta particles while passing 60 percent of the 3.3 m.e.v. beta particles. As illustrated in FIGURE 3, it is also contemplated that the 1.0 m.e.v. beta rays may be excluded from the beta ray counter 40 by means of a suitable filter 50 or shield of aluminum foil, for example, between the indium foil 43 and the counter 40.

The resonance neutron detection apparatus of the present invention as herein described has a relatively high efficiency for the detection of resonance neutrons and has an effective time constant of 13 seconds due to the selective detection of the 3.3 m.e.v. betas to the exclusion of the 1.0 m.e.v. betas.

In the operation of the herein described instrument fast neutrons are emitted by the source 20 and pass outwardly through the casing into the earth formations in the vicinity of the instrument where they are slowed down by materials of the formation, especially by the hydrogen of water or hydrocarbon oil or gas present in the pores of the formation. In regions of the formation having a relatively large quantity of hydrogen the fast neutrons are slowed to a predetermined energy level within a relatively short distance from the source. Thus, at a predetermined distance from the source, beyond the so-called critical distance where the neutron flux is substantially constant despite variations in porosity, i.e., hydrogen content, the flux of neutrons having a given lower energy value will decrease with increasing hydrogen content in the formation. According to the present invention substantially only neutrons in the indium resonance integral are detected at a fixed distance from the source. Since thermal neutrons are not detected, the presence in the formation of material having an appreciable thermal neutron capture cross section will not substantially affect the logging signal, for example, chlorine in salt water. Likewise, gamma radiation in the formation, whatever its cause, will not substantially affect the logging signal.

An example of a suitable thin walled beta ray counter of the type which is suitable in carrying out the present invention is the model 1B85 counter manufactured by the Victoreen Instrument Company, Cleveland, Ohio. This counter has a tubular aluminum wall of 30 mg./cm.$^2$. The Victoreen 1B85 Geiger counter tube is listed and described in the United States Atomic Energy Commission Radiation Instrument Catalog, Catalog No. 2, Part 1, 1950, issued by Technical Information Division, ORE, Oak Ridge, Tennessee, at page BG-2A9A, July 1, 1949, AEC No. BG-2A9A.

Obviously many modifications and variations of the invention, as hereinbefore set forth, may be made without departing from the spirit and scope thereof, and therefore only such limitations should be imposed as are indicated in the appended claims.

I claim:

1. Apparatus for conducting a neutron log of the earth formations traversed by a bore hole comprising an instrument adapted to be passed through the bore hole, said instrument including a source of neutrons for irradiating the earth formations along the traverse of the bore hole, a detector of neutronic radiations resulting in the bore hole due to irradiation of the earth formations, said detector comprising a relatively thin-walled beta ray counter of the Geiger type, a predetermined quantity of indium foil substantially surrounding the active volume of said beta ray counter, and means for selectively preventing beta rays of about 1 m.e.v. from passing into said counter from said foil while permitting beta rays of about 3.3 m.e.v. to pass from said foil into said counter for detection.

2. Apparatus for conducting a neutron log of the earth formations traversed by a bore hole comprising an instrument adapted to be passed through the bore hole, said instrument including a source of neutrons for irradiating the earth formations along the traverse of the bore hole, a detector of neutronic radiations resulting in the bore hole due to irradiation of the earth formations, said detector comprising a relatively thin-walled beta ray counter of the Geiger type, a predetermined quantity of indium foil substantially surrounding the active volume of said beta ray counter, means for selectively preventing beta rays of about 1 m.e.v. from passing into said counter from said foil while permitting beta rays of about 3.3 m.e.v. to pass from said foil into said counter for detection, and means substantially surrounding the active volume of said counter and said indium foil for selectively absorbing thermal neutrons in the vicinity of the detector.

3. Apparatus for conducting a neutron log of the earth formations traversed by a bore hole comprising an instrument adapted to be passed through the bore hole, said instrument including a source of neutrons for irradiating the earth formations along the traverse of the bore hole, a sealed metallic housing containing a detector of neutronic radiations resulting in the bore hole due to irradiation of the earth formations, said detector comprising a relatively thin-walled beta ray counter of the Geiger type, a predetermined quantity of indium foil within said housing and substantially surrounding the active volume of said beta ray counter, means for selectively preventing beta rays of about 1 m.e.v. from passing into said counter from said foil while permitting beta rays of about 3.3 m.e.v. to pass from said foil into said counter for detection, and means substantially surrounding said housing in the vicinity of said detector for selectively absorbing thermal neutrons while permitting higher energy neutrons to pass into the detector.

4. Apparatus according to claim 1 wherein the means for selectively preventing beta rays of about 1.0 m.e.v. from passing into said counter from said foil while permitting beta rays of about 3.3 m.e.v. to pass from said foil into said counter for detection resides in the provision of a beta ray counter wall of predetermined thickness and shielding ability.

5. Apparatus according to claim 1 wherein said means for selectively preventing beta rays of about 1.0 m.e.v. from passing into said counter from said foil while permitting beta rays of about 3.3 m.e.v. to pass from said foil into said counter for detection comprises a shield interposed between said foil and said counter.

6. Apparatus according to claim 3 wherein the metallic housing comprises a substantial quantity of iron and wherein the means surrounding the housing in the vicinity of said detector for selectively absorbing thermal neutrons comprises a layer of cadmium.

7. Apparatus for conducting a neutron log of the earth formations traversed by a bore hole comprising an instrument adapted to be passed through the bore hole, said instrument including a source of neutrons for irradiating the earth formations along the traverse of the bore hole, a detector of neutronic radiations resulting in the bore hole due to irradiation of the earth formations, said detector comprising a beta ray counter, a predetermined quantity of indium foil in proximity to the beta ray-sensitive portion of said counter and energy level selective means for rendering said counter selectively sensitive to beta rays emitted by said foil having an energy of 3.3 million electron volts while effectively rendering said detector insensitive to beta rays emitted by said foil having an energy of 1.0 million electron volts.

8. Apparatus as defined in claim 7 wherein said energy level selective means comprises a predetermined quantity of beta ray shielding material interposed between said foil and the beta ray-sensitive portion of said counter.

References Cited in the file of this patent

UNITED STATES PATENTS

| | | |
|---|---|---|
| Re. 24,383 | McKay | Oct. 29, 1957 |
| 2,469,463 | Russell | May 10, 1949 |
| 2,721,944 | Ruble | Oct. 25, 1955 |
| 2,733,355 | McKee | Jan. 31, 1956 |
| 2,863,062 | Sturm | Dec. 2, 1958 |
| 2,969,307 | Fermi et al. | Jan. 24, 1961 |

OTHER REFERENCES

Tittle: Slow Neutron Detection by Foils, Nucleonics, June 1951, pages 5–9.

Greenfield et al.: Measuring Flux Absolutely with Indium Foils, Nucleonics, March 1957, pages 57–61.